United States Patent [19]

Entenman

[11] Patent Number: 4,691,318

[45] Date of Patent: Sep. 1, 1987

[54] DATA TRANSMISSION SYSTEM WITH ERROR CORRECTING DATA ENCODING

[75] Inventor: Alan W. Entenman, Bohemia, N.Y.

[73] Assignee: Radyne Corporation, Bohemia, N.Y.

[21] Appl. No.: 878,392

[22] Filed: Jun. 19, 1986

Related U.S. Application Data

[63] Continuation of Ser. No. 472,234, Mar. 4, 1983, abandoned.

[51] Int. Cl.[4] ............................................. G06F 11/12
[52] U.S. Cl. ...................................................... 371/43
[58] Field of Search ....................... 371/43, 44, 37, 45; 375/27, 38, 39

[56] References Cited

U.S. PATENT DOCUMENTS

| | | | |
|---|---|---|---|
| 3,665,396 | 5/1972 | Forney | 371/43 |
| 3,938,085 | 2/1976 | Battail | 371/43 |
| 4,165,444 | 8/1979 | Gordon | 371/43 |
| 4,193,062 | 3/1980 | En | 371/43 |
| 4,395,768 | 7/1983 | Guethals et al. | 371/43 |
| 4,500,994 | 2/1985 | McCallister et al. | 371/43 |
| 4,553,237 | 11/1985 | Nakamura | 371/43 |

OTHER PUBLICATIONS

Chen et al., "Error Correcting Codes for Satellite Communication Channels", IBM J. Res. Develop., Mar. 1976, pp. 168–175.

Forney, "A High-Speed Sequential Decoder Prototype Design and Test", IEEE Transactions on Communication Tech., vol. COM-19, No. 5, Oct. 1971, pp. 821–835.

Ungerboeck, "Channel Coding with Multilevel/Phase Signals," IEEE Trans. Inform. Theory, vol. IT-28, pp. 55–67, Jan. 1982.

Taylor et al, "A Simulation Study of Two Bandwidth Efficient Modulation Techniques," IEEE Trans. Commun., vol. COM-29, pp. 267–275, Mar. 1981.

Primary Examiner—Michael R. Fleming
Attorney, Agent, or Firm—Stephen B. Judlowe

[57] ABSTRACT

A multiphase communication system for simultaneously transmitting plural binary digits employs one or more error-check bits which perform an encoding on the conveyed information over a plurality of digit intervals. The information and error check digits are then communicated via a transmission channel—as by amplitude modulating phase-orthogonal carriers.

Upon reception, the incoming information and error check digits are decoded, and supplied to error syndrome circuitry which corrects errors which may arise from time to time during data transmission.

1 Claim, 5 Drawing Figures

DATA TRANSMISSION SYSTEM WITH ERROR CORRECTING DATA ENCODING

This application is a continuation of application Ser. No. 472,234 filed Mar. 4, 1983, abandoned.

DISCLOSURE OF THE INVENTION

This invention relates to electronic communications and, more specifically, to an improved data transmission and reception system employing error detection and correction.

It is an object of the present invention to provide an improved data transmission system.

More specifically, it is an object of the present invention to provide improved data transmission apparatus which coincidentally transmits plural digits via quadrature phase modulation; and which encodes the outgoing digital information to detect and correct errors in the received information data stream.

SUMMARY OF THE INVENTION

The above and other objects of the present invention are realized in a specific, illustrative multi-phase communication system for simultaneously transmitting plural binary digits which employs one or more error-check bits to perform an encoding on the conveyed information over a period of time. The information and error check digits are then communicated via a transmission channel—as by amplitude modulating phase-orthogonal carriers.

Upon reception, the incoming information and error check digits are decoded, and supplied to error syndrome circuitry which corrects errors which may arise from time to time during data transmission.

BRIEF DESCRIPTION OF THE DRAWINGS

The above and additional features and advantages of the present invention will become more clear from the following detailed description of a specific, illustrative embodiment thereof, presented hereinbelow in conjunction with the accompanying drawing, in which.

DESCRIPTION OF THE PREFERRED EMBODIMENT

Figure 1:
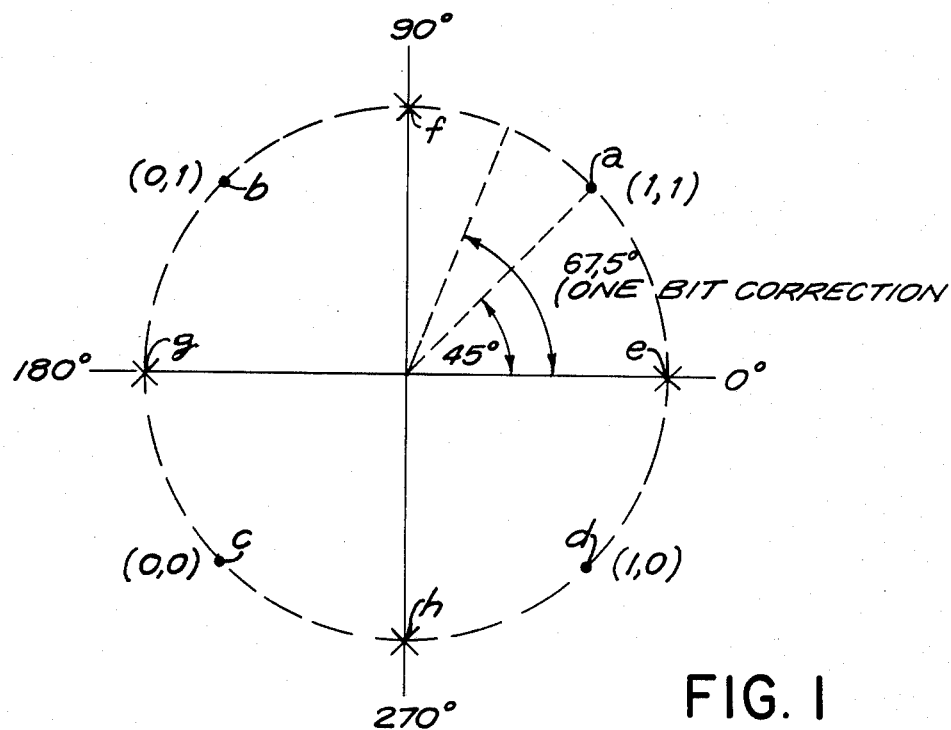
FIG. 1 is a signal space diagram depicting multiphase transmission of the prior art and of the instant invention.

Referring now to the drawing and more particularly FIG. 1, there is shown a signal space diagram for multiphase, e.g., quadrature, transmission. As is per se well known (e.g., for QPSK or quadrature phase shift keying transmission), two carriers are independently amplitude modulated along orthogonal (i.e., 90° phase shifted) axes. Thus, for conventional QPSK transmission one carrier assumes an orientation along the plus or minus X-axis (0° or 180° phase shift) depending upon one of two bits for the di-bit encoding; while another carrier resides along either the plus or minus Y axis (90° or 270° transmission) in accordance with the binary value of the second bit. Accordingly, an outgoing QPSK radiation will assume one of the points a-d of FIG. 1 depending upon the value of the two information bits to be transmitted. Such QPSK coding is widely employed and basically has a phase error margin of 45°. That is, a received QPSK signal may vary from its nominal value and still be properly detected as long as the variation does not exceed 45°. Once the 45° limit is exceeded, the received point appears closer to a different QPSK state and thus an error occurs in one of the two information bits.

In QPSK transmission, all carriers have a like nominal amplitude. For purposes of the FIG. 1 description assuming a unit circle sample space (shown dashed in FIG. 1), the relative amplitude of each carrier for QPSK transmission (permissible transmission states a-d) is always $\pm\sqrt{2}/2$.

In accordance with the principles underlying one aspect of the instant invention, eight possible transmission states, given by the points a-h of FIG. 1, are utilized. To determine one of eight states (vis-a-vis, one of four for conventional QPSK transmission) a third outgoing phase-specifying digit is developed in addition to the two di-bit outgoing information values (herein deemed $x_2$ and $x_1$). This third digit is an error encoding bit stream and is deemed herein $x_0$. It will now be apparent from FIG. 1 that the error correcting additional bit increases the phase margin for properly recovering a di-bit transmission by $22\frac{1}{2}°$ to a total of 67.5° as shown in FIG. 1 (thus effecting approximately a 2 db improvement in error rejection).

By way of overview, the ability to correct for single errors is imparted to the apparatus of the instant invention by employing at the transmitter an additional bit which performs an encoding over the two outgoing digital data streams. Moreover, the encoding is effected over a period of time such that each error correcting, encoding digit represents information which is in general descriptive of each of (i) the first (or $x_2$) data bit and the previous such bits over some plural-digit time interval; (ii) the second (or $x_1$) data bit and the previous such bits over a predetermined interval; and (iii) the coding or error check bit ($x_0$) data stream over the like interval.

At the receiver, the recovered information data streams $x'_2$ and $x'_1$ are delayed for the number of digit intervals over which the encoding was performed (as is also the received coding bit stream $x'_0$). The inverse of the coding operation effected at the transmitter is then accomplished. If the recovered information $x'_2$, $x'_1$ and $x'_0$ suffered no errors, the parity will fully check and the $x_2$ and $x_1$ data is simply passed to an output utilization device or circuit. However, if any error in reception or receiver data processing has occurred, the parity will not check in the receiver decoding apparatus and then the error syndrome processing structure will then operate in the manner more fully described below to overcome or cure the error in the received information.

Figure 2:
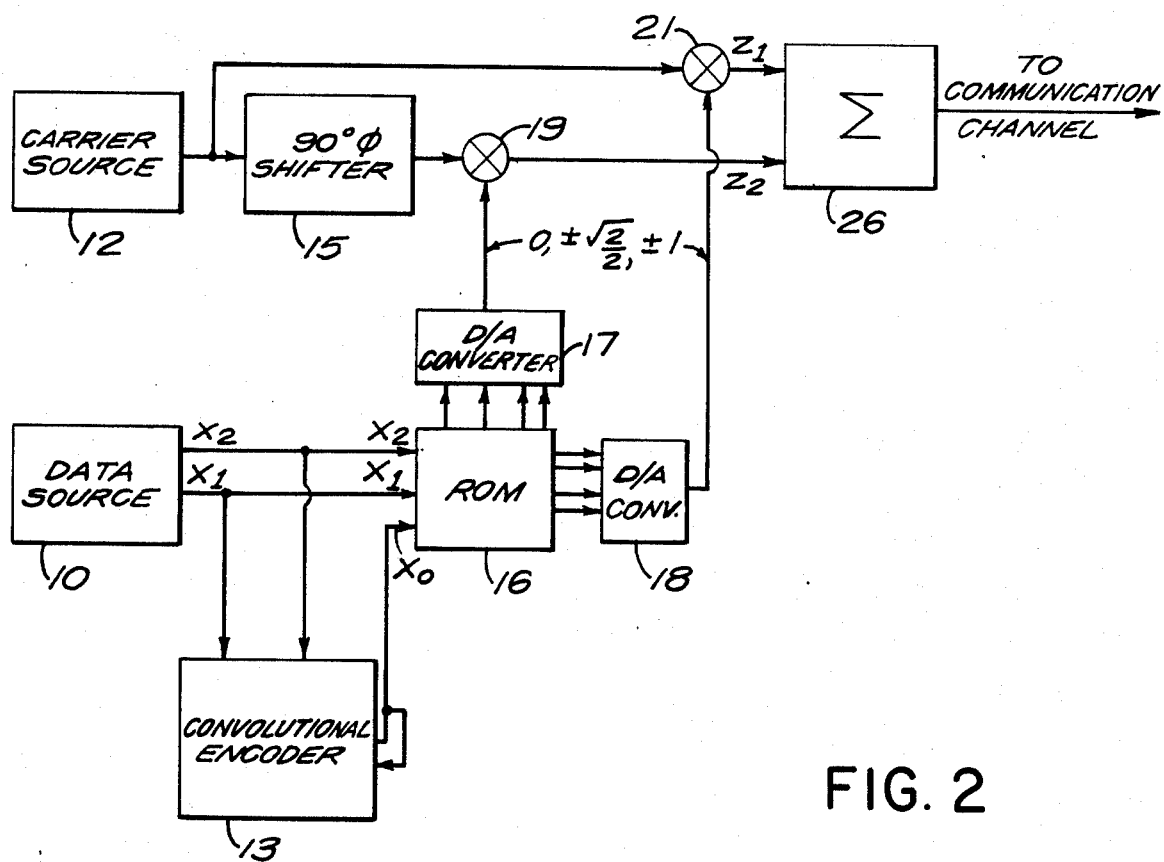
FIG. 2 is a block diagram of transmitter circuitry of the instant invention.
Figure 3:
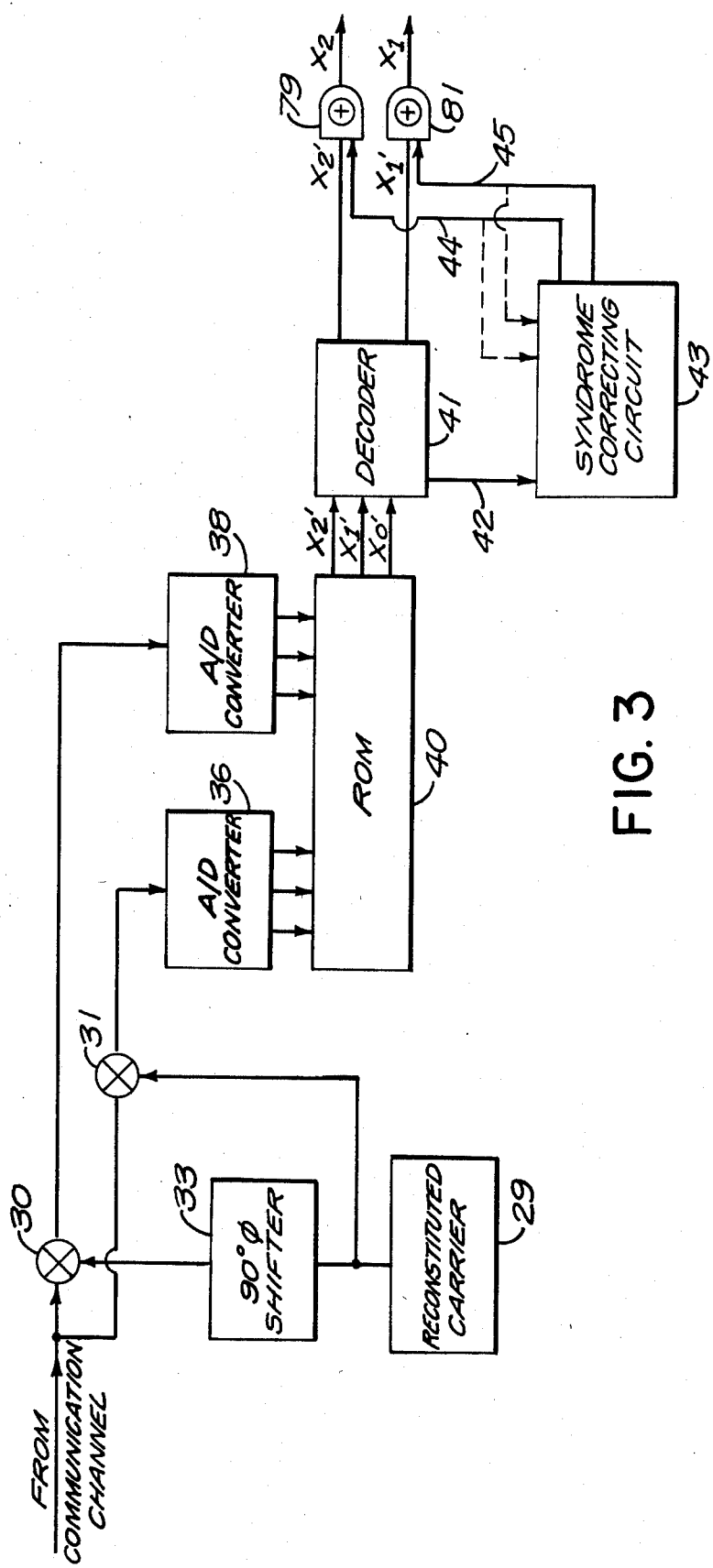
FIG. 3 schematically depicts receiver circuitry operative in conjunction with the FIG. 2 transmission apparatus.
Figure 4:
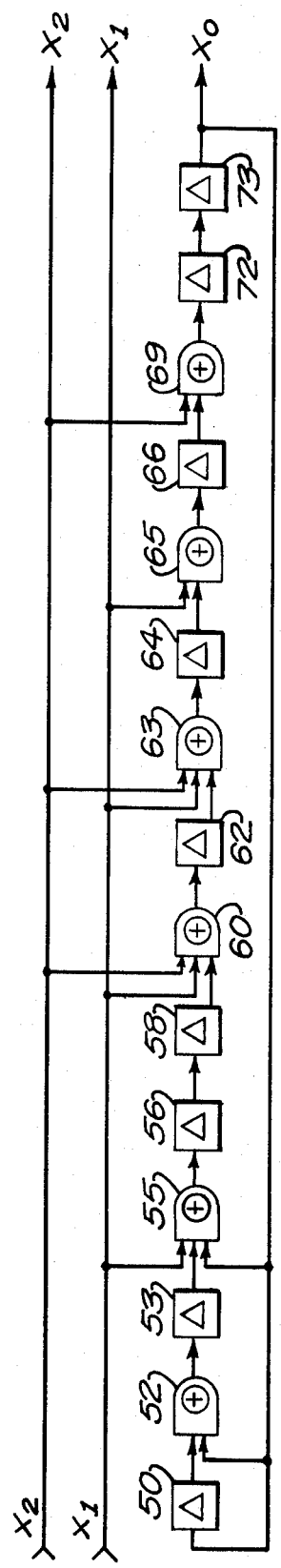
FIG. 4 represents a specific, illustrative implementation of transmitter convolutional encoder circuitry 13 of FIG. 2.

With the above overview in mind, attention will now be directed to the transmission and receiver apparatus of FIGS. 2 and 3 which specifically implement the above discussed overall mode of operation. Considering initially the transmitter apparatus of FIG. 2, a data source 10 supplies two data serial streams $x_2$ and $x_1$ such that for the instant di-bit-transmission during each digit or bit time, there exists one binary value for each of $x_1$ and $x_2$. The $x_2$ and $x_1$ values are then supplied to a convolutional encoder 13 (together with the internally generated error or check bit stream output $x_0$ which is fed back into the circuit). The convolutional encoder includes a number of delay elements and during each bit time provides a specific output value $x_0$ which is dependent upon the current and/or past values of $x_2$, $x_1$ and $x_0$ over some interval. A specific embodiment of the convolutional encoder 13 is shown in FIG. 4 and is discussed below. Again, suffice it for present purposes that the error check output bit stream $x_0$ performs an error correction encoding on both itself and on the $x_2$ and $x_1$ data flow. Specific error detecting and correction codes are per se well known to those skilled in the art—see, e.g., FIG. 4 and the discussion below.

During each data interval, the then obtaining $x_2$, $x_1$ and $x_0$ binary values constitute addressing inputs to a read only memory (ROM) 16 which for each one-of-eight input address conditions supplies three amplitude and one polarity defining input to each of digital-to-analog converters 17 and 18. The outputs of the digital-to-analog converters 17 and 18 supply an analog level of one-of-three bi-polar states sufficient to give rise to one of the eight permissible transmission points a–h of FIG. 1 depending upon the input variables $x_2$, $x_1$ and $x_0$.

More specifically, with respect to the outgoing quadrature phase transmission, a carrier source 12 supplies a source of carrier directly to a modulator 21 wherein the 0° phase carrier is modulated by the output of the digital to analog converter 18. The output carrier of source 12 is shifted by 90° in a phase shifter 15 and is supplied to the modulator 19. The output amplitude of modulator 19 is controlled by digital-toanalog converter 17.

Accordingly, in a per se straightforward manner the input variables $x_2$, $x_1$ and $x_0$ to ROM 16 specify one of the eight transmission points a–h; and the output of ROM 16 acting in consort with the digital to analog converters 17 and 18 and modulators 19 and 21 generate the requisite two modulated quadrature carrier signals to implement the desired transmission point. It is apparent that instead of the shifted amplitude signals of the QPSK situation considered above, the phase modulated carrier signals o instant transmission system have relative values of "0"$\pm\sqrt{2}/2$, and $\pm$"1" for the assumed unit circle of FIG. 1. The two modulated quadrature carriers $Z_1$ and $Z_2$ are then combined in a linear summing network 26 and impressed upon a communications channel for distribution to any and all intended recipients. The communications channel may be of any form well known to those skilled in the art, e.g., radio carrier, wire communications or the like.

Thus, it will be seen that for each digit period, the two then obtaining characters $x_2$ and $x_1$—together with the coincidentally present error bit $x_0$ define a specific transmission point of FIG. 1—and that the phase and amplitude of the outgoing quadrature carriers in general varies from digit period to digit period in accordance with the incoming data streams and in accordance with the history of those streams as reflected by the $x_0$ signal.

At each receiver location (FIG. 3), a reconstituted carrier source 29 supplies a carrier in phase with that of the carrier source 12 at the transmitter. Carrier reconstitution circuitry is per se well known to those skilled in the art and may be implemented, for example, by simply multiplying the incoming carrier signal by a factor of eight to resolve phase ambiguity; and dividing the eighth harmonic so formed by a factor of eight. The reconstituted carrier 29 is supplied directly to detector (e.g., a synchronous mixer and low pass filter) 31. Further, the reconstituted carrier from source 29 is shifted in phase by 90° in circuitry 33 and supplied to detector 30. The outputs of the detectors 30 and 31 (which correspond to the analog levels of converters 18 and 17) are respectively supplied to analog-to-digital converters 38 and 36. The output of converter 36 is a three bit digital word which corresponds in the absence of transmission error to the input at the transmitter (FIG. 2) to digital-to-analog converter 18. Similarly, the output of analog-to-digital converter 38 at the receiver corresponds to the three digital bits supplied to the digital-to-analog converter 17.

The read only memory (ROM) 40 at the receiver provides a function inverse to that effected by ROM 16 in the transmitter. In particular, the six bit output of analog-to-digital converters 36 and 38 are address inputs to ROM 40 (and specify the x and the y coordinates of the received signal point). The ROM 40 includes a stored pattern which converts these inputs to the equivalent $x'_2$, $x'_1$ and $x'_0$ received versions of the original $x_2$ and $x_1$ and $x_0$ outgoing data at the transmitter. The use of the prime designations on the x-underlying variables indicates received versions of the outgoing data. The $x'_2$, $x'_1$ and $x'_0$ data will identically equal the $x_2$, $x_1$ and $x_0$ variables in the absence of error. Should a transmission error or receiver data processing error occur there of course will be a difference between the two and it is the function of the instant apparatus to detect and correct that difference and that error.

The received $x'_2$, $x'_1$ and $x'_0$ signals are supplied to a decoder circuit 41 which provides a decoding which is the inverse of that effected by convolutional encoder 13. The decoder 41 includes delay apparatus for delaying between its input and output the $x'_2$, $x'_1$ and $x'_0$ signals for an interval corresponding to the encoding period for convolutional encoder 13. Assuming that the received signals are identical to the transmitted signals, the decoder 41 supplies on an output lead 42 to a syndrome correcting circuit 43 characterized by an error-free signalling state (e.g., a binary "0") indicating that no errors have occurred. As long as this situation obtains, the delayed $x'_2$ and $x'_1$ outputs of decoder 41 pass without change through Exclusive-OR gates 79 and 81 such that the recovered $x_2$ and $x_1$ signals are available for any desired output utilization purpose. However, when an error does occur, the output lead 42 switches to its alternate (assumed "1") state. Depending upon the nature of the error and the power of the code employed, one or perhaps both of the erroneous $x'_2$ or $x'_1$ variables are corrected in the corresponding Exclusive-OR gates 79 or 81 by "1" output signal on leads 44 or 45 (since a "1" input to an Exclusive-OR gate will invert whatever binary level is applied to the other input of an Exclusive-OR gate). A specific implementation for decoder 41 and the syndrome correcting circuit 43 operative with respect to the specific encoder 13 shown in FIG. 4 is discussed below with respect to FIG. 5.

Turning now to FIG. 4, there is shown a specific convolutional encoder 13 used in the transmitter portion of the instant communication apparatus (FIG. 2). The apparatus includes an array of cascaded unit delay circuits 50, 53, 56, 58, 62, 64, 66, 72 and 73, i.e., delays of one digit period for the data streams $x_2$ and $x_1$. A plurality of Exclusive-OR gates 52, 55, 60, 63, 65 and 69 are disposed between illustrated ones of the unit delay elements. As above discussed, it is the purpose of the encoder to perform an encoding over the $x_2$, $x_1$ and $x_0$ digits over a predetermined number of prior bit intervals. Thus, for the FIG. 4 encoder, the error bit encoding $x_0$ will include a measure of the $x_2$ signal from two bit times prior (effected by delays 72 and 73 through the flow combining effect of Exclusive-OR gate 69), of the $x_2$ digit four digits prior (delays 64, 66, 72 and 73 with the combining and pass through effects of Exclusive-OR gates 63, 65 and 69); and five bits prior (via delays 62, 64, 66, 72 and 73 and their associated Exclusive-OR gates. Similarly, $x_0$ is also a function of the $x_1$ variable occurring 3, 4, 5 and 7 bit times earlier; and of its own error check-encoding character $x_0$ stream 7, 8, and 9 times earlier. Expressed in mathematical terms, $$x_0 = x_2(D^2+D^4+D^5) + x_1 \cdot (D^3+D^4+D^5+D^7) + x_0 \cdot (D^7+D^8+D^9) \quad \text{Eq. 1}$$

where "D" is an operator representing one unit of delay, "$D^2$" represents two units of delay, and so forth. Rearranging Equation 1, $$x_0 - x_0(D^7+D^8+D^9) = x_2(D^2+D^4+D^5) + x_1(D^3+D^4+D^5+D^7) \quad \text{Eq. 2}$$

and solving for $x_0$, $$x_0 = \frac{x_2(D^2+D^4+D^5) + x_1(D^3+D^4+D^5+D^7)}{1 - [D^7+D^8+D^9]} \quad \text{Equation 3}$$

Letting operators $G_2$, $G_1$ and $G_0$ represent the functional dependence of $x_0$ on $x_2$, $x_1$ and $x_0$, respectively, Equation 3 may be rewritten, $$x_0 = \frac{x_2 G_2 + x_1 G_1}{1 - G_0} \quad \text{Equation 4}$$

For purposes which will become more clear below when operation of the FIG. 5 decoder 41 is considered, Equation 4 may be rewritten, $$0 = x_2 G_2 + x_1 G_1 + x_0(G_0 - 1) \quad \text{Eq. 5}$$

The negative sign in the last parenthetical expression Equation 5 may be changed to a positive yielding Equation 6, $$0 = x_2 G_2 + x_1 G_1 + x_0(G_0 + 1), \quad \text{Eq. 6}$$

since, for the modulo-2 purpose effected by the Exclusive-OR gates of the instant apparatus, subtraction and addition yield identical results. Thus it will be clear from the foregoing in FIG. 4 that the expression for the output encoding bit stream $x_0$ is given by Equation 3 (or 4) above and that $x_0$ in fact is dependent upon events occurring as many as nine digit times earlier.

Figure 5:
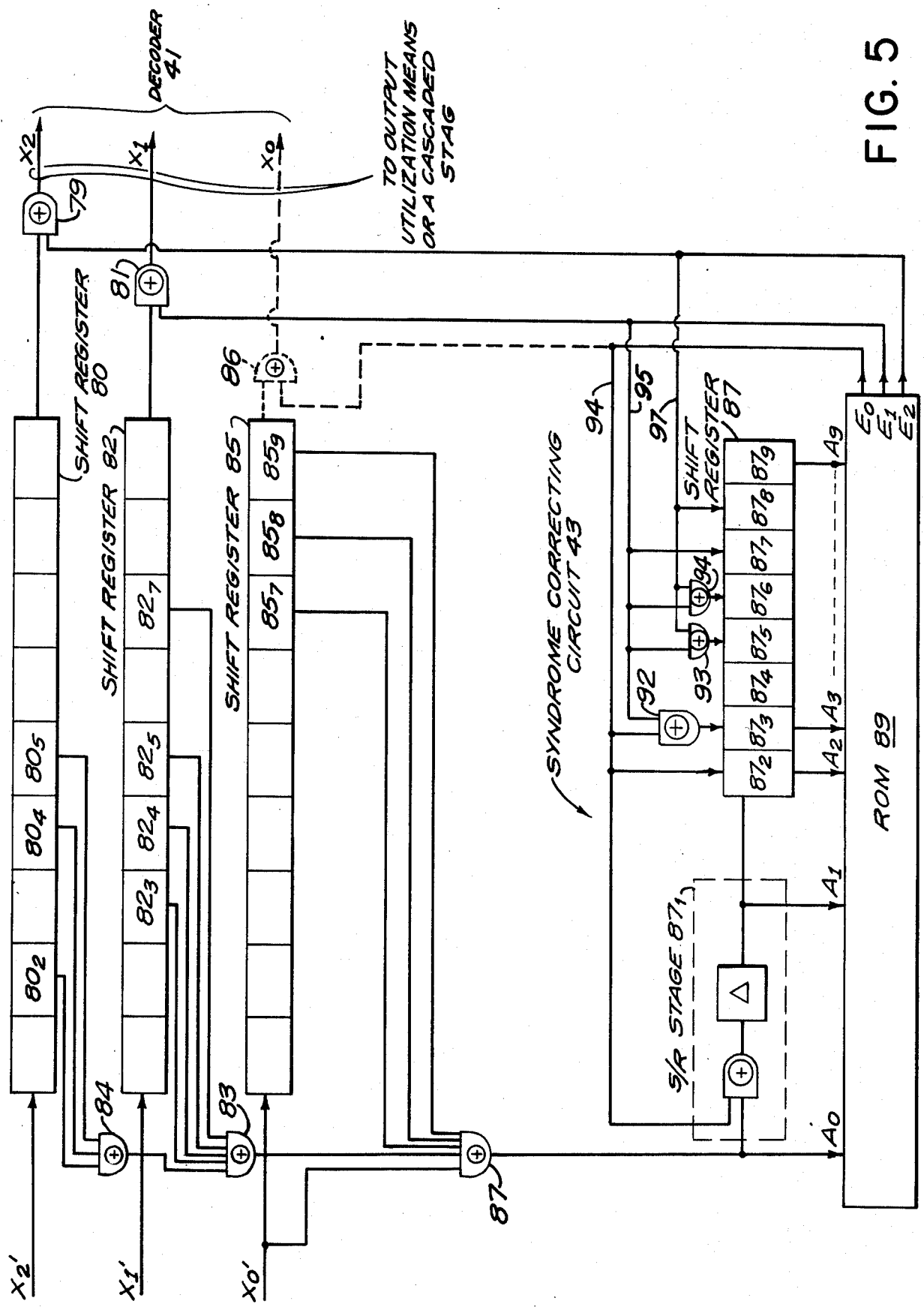
FIG. 5 illustrates a specific, illustrative implementation for decoder 41 and syndrome error correcting apparatus 43 utilized in the FIG. 3 receiver.

A specific implementation for decoder 41 and syndrome correcting circuit 43 operative in conjunction with the FIG. 4 implementation of transmitter encoder 13 is shown in FIG. 5. The received versions of the transmitted data $x_2$, $x_1$ and $x_0$, viz., $x'_2$, $x'_1$ and $x'_0$, are respectively loaded into nine stage shift registers 80, 82 and 85. Nine stages are employed for the shift registers since nine digit times of data must be examined to recheck the parity effected by encoder 13 (FIG. 4) which was operative in conjunction with $x_0$ digits occurring nine digit intervals earlier. The shift registers 80, 82 and 85, operative in conjunction with cascaded Exclusive-OR gates 84, 83 and 87 to recheck the accuracy or parity of the received digits—in essence employing the algorithm or expression of Equation 6 above. That is, if the received digits $x'_2$, $x'_1$ and $x'_0$ accurately and identically correspond to $x_2$, $x_1$ and $x_0$, Equation 6 will be satisfied and the output of the final Exclusive-OR gate 87 will be a binary "0" indicating that no error has occurred. Thus, for example, during encoding the $x_2$ variable was sampled with unit delays of $D^2$, $D^4$ and $D^5$. Accordingly, the output of the second, fourth and fifth shift register 80 stages $80_2$, $80_4$ and $80_5$ are utilized. Similarly examining shift registers 82 and 85 it will be seen that the $x'_1$ received signal is sampled with unit delays of $D^2$, $D^4$ and $D^7$ (corresponding to $G_1$ in Equations 36) while $x'_0$ is sampled with unit delays $D^7$, $D^8$ and $D^9$ as well as a direct ("1") connection into the final Exclusive-OR gate 87 ("$1 + G_0$" in Equations 3-6). Again, if no transmission errors were incurred, the output of gate 87 is and will remain a "0". Accordingly, the output of syndrome error correction circuit 43 and more specifically a error correction pattern storing read only memory (ROM) 89 will have at its output terminals $E_0$-$E_2$ an array of all "0's" thus not inverting the outputs of the Exclusive-OR gates 79 and 81. Under this condition, the correct $x_2$ and $x_1$ signals flow out of the Exclusive-OR gates 79 and 81 and appear as the desired output data $x_2$ and $x_1$.

Conversely, if an error does occur, the output of the Exclusive-OR gate 87 will be a "1" rather than a "0". Further, as each error occurs, it will flow through a shift register 87 also having nine stages each formed of an Exclusive-OR gate and following unit delay. The particular pattern of "1's" and "0's" at the output of the shift register 87 stage form address inputs to the correction storing ROM 89 and, for each address input, the appropriate stored correction signals are recovered and impressed on the output ports $E_2$-$E_0$. Where a "1" appears on the corresponding ROM 89 output, the output of the respective gate 79 or 81 is inverted thus correcting the desired error. The particular contents of ROM 89 depends upon the correspondence between the pattern of detected errors (if any) stored in the shift register 87—and the inversion(s) required to correct that error condition. Again, where the shift register 87 stores all "0's" indicating no errors, a "0" appears at each of the outputs $E_2$-$E_0$. The pattern for $E_2$-$E_0$ for any non-zero address input depends on the particular coding and the like used and may be empirically or computationally derived. Thus, for example, single or multiple errors may simply be postulated for the received variables $x'_2$, $x'_1$ and $x'_0$—and the pattern in shift register 87 computed as the error(s) ripple through register 87. The necessary correction outputs $E_2$-$E_0$ are then computed for each state of register 87—and define the stored three-bit contents of the corrective word stored at the corresponding address in ROM 89. The process continues for all errors —and error combinations of interest to define all used address locations in ROM 89.

Accordingly, the apparatus of FIGS. 2 and 3 using the specific implementations of FIGS. 4 and 5 includes data formed over nine digit intervals upon transmission; and rechecks the transmitted parity upon reception, correcting any detected errors. Many forms of codes may be employed depending upon the hardware, complexity and code pattern desired for any particular application.

In accordance with one aspect of the present invention, stored errors in the shift register stages $87_i$ may be cleared (after output correction) by employing a feed back path from the outputs $E_2-E_0$ to the appropriate inputs of the stages $87_i$. The particular connection patterns of FIG. 5 correspond to that for the assumed encoding and decoding apparatus 13 and 41, and effectively comprises the inverse of the delays effected by the shift registers 80, 82 and 85. Thus, for example, the $E_0$ correction signal (corresponding to $x'_0$ errors) is connected to the first, second and third stages $87_1$, $87_2$ and $87_3$ rather than to the last three stages of shift register 85 in decoder 14. Similarly, the feed back connections for the $E_1$ and $E_2$ outputs are the mirror inverse for those of the shift registers 82 and 80. Exclusive-OR gates (e.g., gates 92-94) are utilized where more than one output resets any particular stage of shift register 87. Thus, for example, the third stage $87_3$ is reset by both the $E_1$ and $E_0$ signals (corresponding to connections from shift register stages $82_7$ and $85_7$ in the decoder 41. Note also the corresponding use of the exclusive-OR gates 93 and 94 for the $x_2$ and $x_1$ stage $80_4$, $80_5$ and $82_4$, $82_5$ connections of decoder 41. The above feed back connection is optional and when employed will increase system performance.

The maximum error correction capability of the code employed can be achieved if the functions of the decoder 41 and the syndrome correcting circuit 43 are cascaded, i.e., if the structure of FIG. 5 is replicated with outputs $x_{2,j}$, $x_{1,j}$ and $x_{0,j}$ for each stage are supplied as inputs to a j+1st stage. For this purpose, an Exclusive-OR gate 86 is added (shown dashed in FIG. 5) to correct the $x''_0$ bit prior to the $x''_2-x''_0$ bits being fed into a cascaded, following FIG. 5-type arrangement. This cascade may be repeated as many times as is needed. In practice, the full capability is achieved in three or four sections.

The storage pattern for ROM 89 is different for each stage of the cascade. The first ROM corrects only the most easily corrected errors. Later ROM's correct the more difficult to correct errors i.e., multiple clustered errors. This may be thought of as having the earlier ROM's "clear the field" for the final correction stage. The final stage does not require the Exclusive-OR gate 86.

The above described arrangement is merely illustrative of the principles of the present invention. Numerous modifications and adaptations thereof may be readily apparent to those skilled in the art. Thus, for example, any number of concurrent data streams $x_i$ may be encoded by any number of error correction digits $x_{0j}$, it simply requiring a signal space having sufficient transmission conditions to reflect each of the different $x_i$, $x_{0j}$. Further, as above discussed, the specific coding and decoding implemented may be as elaborate or straightforward as desired by the user depending upon the economics of any application, considering cost, signal delay time and the like.

What is claimed is:

1. In combination in multiphase data communications apparatus for transmitting digital information, transmitter means for supplying at least one digital information data stream $x_1$, convolutional encoding means having an output bit stream $x_0$ for performing a continuous, non-block error correcting encoding on said data stream $x_i$ and on its own output $x_0$ given by $$x_0 = x_i G_i + x_0 G_0$$

where $G_i$ and $G_0$ are independent Boolean expressions relating values over plural digit intervals of $x_i$ and $x_0$ respectively to $x_0$, and signalling means coincidentally modulated by the $x_0$ output of said convolutional encoding means and by the digital information $x_i$ supplied by said source thereof for disseminating plural carriers of different phases said carriers attaining one of more than four states, and receiving means connected to said signalling means for receiving the digital information from the output of said signalling means, said receiver means including decoder means, including delay means, each connected to the output of said signalling means for providing a first output signal if the expression $$0 = x_i G_i + x_0(1 \pm G_0)$$

is satisfied and a different signal if such expression is not satisfied, and syndrome error detecting and correcting means enabled responsive to the output of said decoding means for selectively inverting the output of said received information depending upon the error state reported thereto by said decoding means.

* * * * *